US006098958A

United States Patent [19]

Becker

[11] Patent Number: 6,098,958

[45] Date of Patent: Aug. 8, 2000

[54] VALVE ASSEMBLY, ESPECIALLY FOR A FUEL-INJECTION VALVE AND METHOD OF MAKING SAME

[75] Inventor: Manfred G. Becker, Novi, Mich.

[73] Assignee: Ernst Thielenhaus KG, Wuppertal, Germany

[21] Appl. No.: 09/073,550

[22] Filed: May 6, 1998

[51] Int. Cl.[7] ...................................................... F16K 31/00

[52] U.S. Cl. .......................... 251/359; 137/533.11; 137/1

[58] Field of Search ....................... 251/359; 137/533.11, 137/1

[56] References Cited

U.S. PATENT DOCUMENTS

| | | | |
|---|---|---|---|
| 1,265,365 | 5/1918 | Parish | 137/533.11 |
| 3,241,822 | 3/1966 | Degenhardt | 137/533.11 |
| 3,955,648 | 5/1976 | Walker Jr. et al. | 137/533.11 |

*Primary Examiner*—A. Michael Chambers
*Attorney, Agent, or Firm*—Herbert Dubno

[57] ABSTRACT

A valve seat for a ball valve, especially a fuel-injection valve for an internal-combustion engine is finely ground to form a trough in the conically-ground seat with a circular arc cross section in planes of the axis and of a depth to eliminate shape variations in the conically-ground valve seat. The circular arc radius of the trough is greater than the radius of the ball.

2 Claims, 4 Drawing Sheets

VALVE ASSEMBLY, ESPECIALLY FOR A FUEL-INJECTION VALVE AND METHOD OF MAKING SAME

SPECIFICATION

FIELD OF THE INVENTION

The present invention relates to a valve assembly, especially for a fuel-injection valve for an internal-combustion engine and comprised of a valve ball and a conical valve seat, to a method of making the valve assembly and particularly the valve seat and to an apparatus for carrying out that method. The invention is particularly directed to the improvement in the valve seat for a ball valve so as to increase the sealing effectiveness where the basic conical configuration of the valve seat is imparted thereto by a machining operation.

BACKGROUND OF THE INVENTION

Ball valves cooperating with conical valve seats are used, for example, with fuel-injection valves for internal-combustion engines and the valve assembly formed by the valve ball and the seat can be provided in very small dimensions with the conical seat being formed in a machine operation and by grinding. As a rule, in the past, the conical seat has been so made that a line contact is formed between the conical surface and the grinding tool.

When conical seats are made in this fashion, it is found that in transverse cross section planes, i.e. cross sections in planes perpendicular to the axis of the conical seat or ground surface, there are deviations of that surface from a perfect circle. These deviations are referred to herein as shape deviations and when the valve assembly is used as a fuel-injection valve of the type described, such shape deviations can exceed 1 $\mu$m from the mean diameter and can be sufficient to give rise to leakage even when the valve is intended to be closed. It will be understood that a mean diameter of such a conical valve seat can be several millimeters. The leakage rates which result have been found to be detrimental to the operation of the internal-combustion engine.

OBJECTS OF THE INVENTION

It is, therefore, the principal object of the present invention to provide an improved valve assembly, especially a ball-valve assembly having a conical seat for a valve ball, whereby this drawback is avoided and leakage is minimized.

It is also an object of the invention to provide an improved seal for a ball-type valve, especially a fuel-injection valve for an internal-combustion engine whereby leakage through the closed valve is eliminated or materially reduced by comparison with earlier systems.

Still another object of the invention is to provide an improved sealing arrangement for a ball-type valve utilizing a conical seat so that the greatest sealing effectiveness is possible between the valve ball and the valve seat so that this sealing effectiveness is achieved with metal valve assemblies, i.e. assemblies in which both the valve seat and the valve ball are metal, for ceramic valve assemblies in which both the valve seat and the valve ball are composed of ceramics, and hybrid valve assemblies where one of the sealing members is composed of metal and the other of a ceramic.

It is also an object of the invention to provide an improved valve assembly for the purposes described whereby drawbacks of earlier valve assemblies are obviated.

It is also an object of the invention to provide an improved method of making the valve assembly and an improved apparatus for carrying out that method.

SUMMARY OF THE INVENTION

These objects and others which will become apparent hereinafter are attained, in accordance with the invention with a conical valve seat which has been subjected to a finish grinding to form in the conical surface an annular seating surface of circular-arc segmental cross section in an axial plane such that the radius of this seating surface, i.e. the radius of the circular arc is greater than the radius of the valve ball and the depth of the trough-shaped seating surface is at least equal to the shape deviations of the conically-ground valve seat so that along the trough-shaped seating surface those deviations are eliminated.

More particularly the valve seat can comprise a body formed with a conical cavity centered on an axis and having a machined conical surface with shape deviations from the circular in transverse cross section, the conical surface being formed with an annular finish-ground seating surface of circular-arc-segmental shape in axial section engageable by the ball valve and having a radius of curvature greater than a radius of the ball valve, the seating surface constituting a trough in the conical surface of dimensions sufficient to eliminate the shape deviations along the seating surface.

Because of the circular-arc-shaped seating surface or trough formed in the conical surface and which has a width which is very small by comparison to the width of the conical surface as a whole, the direct contact between the ball and the trough can be limited. Elimination of shape deviations from the circular in this region or their reduction to a value of less than 0.1 $\mu$m can prevent or limit leakage. The leakage rate reduction has been found to be particularly pronounced when these principles are applied to a hybrid valve, where the ball is composed of metal or ceramic and the seat is composed of ceramic or metal, although significant improvements are obtained when both the seat and the valve are composed of either metal or ceramic. With a sealing arrangement of the invention for a fuel-injection valve whose mean diameter of the valve seat may be several millimeters, the width of the trough-shaped seating surface is preferably 200 to 500 $\mu$m. The trough-shaped seating surface should have a surface roughness of less than 0.1 $\mu$m Ra. At its deepest point, the circular-arc trough-shaped seating surface has a depth in the range of 2 to 10 $\mu$m.

The invention further includes a method of making a sealing seat between a valve ball and a conical valve seat, especially for such fuel-injection nozzles of internal-combustion engines. In this method, a valve body with a conically-ground valve seat is clamped in a rotating workpiece holder while a cylindrical grinding tool for the fine grinding of the trough-shaped seating surface is engaged in a tool holder in an insert which allows radial movement of the grinding tool. The tool holder is rotated about an axis having an angle of attack of 1 to 10° with respect to the rotation axis and workpiece holder and by pressing the tool holder toward the workpiece holder and/or the workpiece holder toward the tool holder, the workpiece and tool are maintained in contact along the edge of the tool at its end face all around the periphery of the conical seat.

The tool holder and the workpiece holder are rotated in opposite senses to form the annular circular arc segmental trough-shaped contact surface in the conical valve seat with a radius of the seating surface greater than the radius of the ball and a depth of the trough sufficient to eliminate the shape deviations at least in the deepest regions of the trough.

Because the tool holder is rotated at a predetermined angle of attack to the rotation axis of the workpiece holder, no oscillating movements or swinging movements arise between the workpiece and the tool which could create shape deviations of the type which are removed by the formation of the trough.

The rotation of the tool and the workpiece in opposite senses generates the annular trough-shaped contact surface with the circular arc configuration in axial planes.

It has been found to be advantageous to hold the grinding stone in a flexible insert in the tool holder, the flexible insert allowing pressing forces between the tool holder and workpiece, radially compensatory movements of the grinding stone which can follow eccentric movements of the conically-ground valve seat to ensure that the grinding stone will contact the valve seat over the entire periphery of the latter at all times. This, of course, ensures the elimination of the shape deviations during the fine grinding of the seating surface.

According to a feature of the invention, the grinding stone is set into a synthetic resin shaft forming the flexible insert and which is received with a radial play of 100 to 300 μm in the tool holder. The rearwardly-extending projection of this shaft can be press-fitted into the tool holder and fixedly clamped therein.

The insert can be held in an axially movable piston in the tool holder, supplied with hydraulic fluid for generating advance and retraction movements of the tool relative to the workpiece holder. It is also desirable to feed, e.g. through central bores of the tool holder, the insert and the grinding tool, a coolant to the contact region between the grinding tool and the workpiece.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
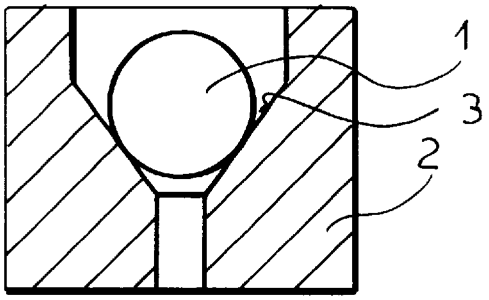
FIG. 1 is a longitudinal section through a sealing arrangement, i.e. a valve assembly, for a fuel-injection valve having a metal valve ball and a metal valve body which can be formed with a conical valve seat according to the invention.

The sealing assembly shown in FIG. 1 is provided for a fuel-injection valve for an internal-combustion engine and comprises a ball valve 1 and a valve body 2 with a conical seat adapted to be contacted by the valve ball 1. The conical valve seat is formed by grinding with a surface roughness of 0.3 to 0.5 μm Ra in accordance with conventional teaching. During this grinding operation shape deviations from the circular are unavoidable and some of these shape deviations are represented, for example, at $S_1$ and $S_2$ in FIG. 2 in which the height or depth of surface features are plotted in μm along the ordinate and axial distance along the conical surface in μm along the abscissa. The shape deviations result from the fact that the grinding operation in the formation of the conical surface takes place only with lines content between the grinding tool and the ground surface. Where the valve seat is 2 to 3 mm in diameter and these shape deviations amount to almost 5 μm in extreme cases, a tight seal is not possible between the ball and the conical valve seat.

Figure 6:
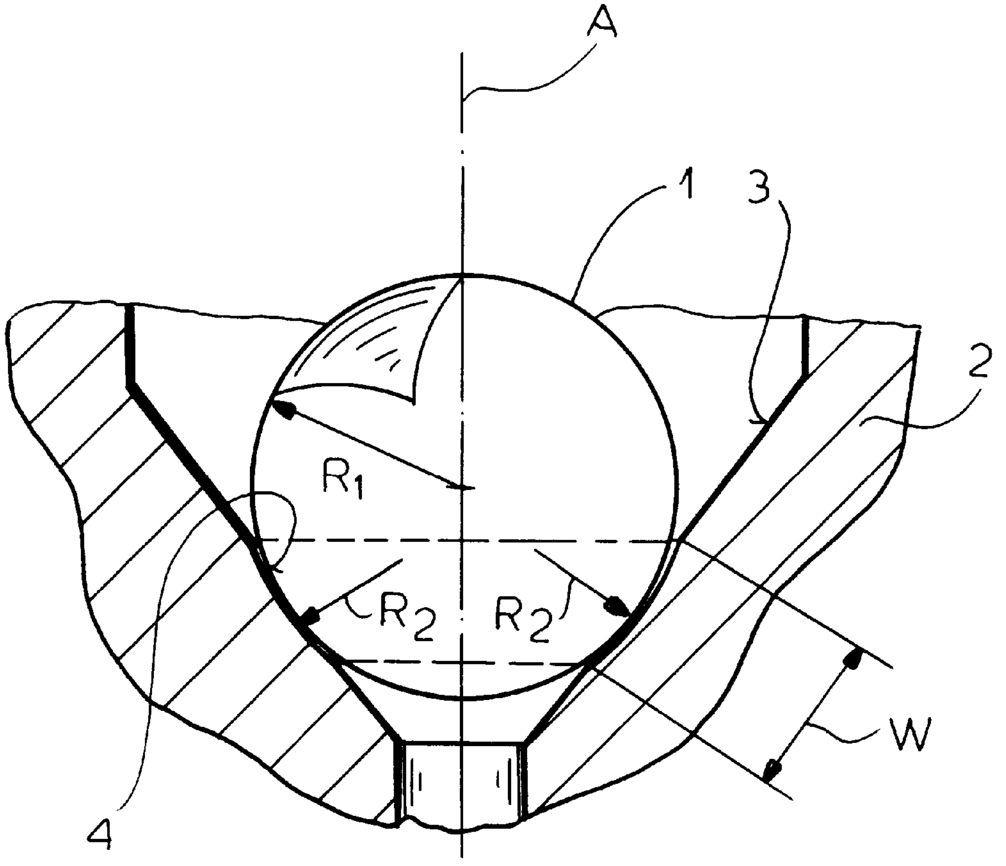
FIG. 6 is an enlarged view of the trough-shaped contact surface between the ball and the valve seat.

However with the invention by a finished grinding operation, an annular seating surface 4 (see FIGS. 2 and 6), can be formed in the workpiece which can have a maximum depth D (FIG. 4) such that the shape deviations $S_1$ and $S_2$ are completely eliminated around the entire trough. The radius of curvature along the circular arc in an axial plane is greater than the radius of the valve ball. This has been shown in FIG. 6 where the radius of curvature of the valve ball is represented at $R_1$ and the radius of curvature of the trough in axial planes, i.e. planes of the axis A, are represented at $R_2$. The radius $R_2$ is greater than the radius $R_1$.

The conical valve seat 3 may have a diameter midway of its axial length of several mm and the width W of the trough may be 200 to 500 μm. The surface roughness of the seating surface 4 is small and in the finished grinding operation can correspond to a mean roughness of 0.1 μm Ra. The depth D may be 2 to 10 μm.

Figure 2:
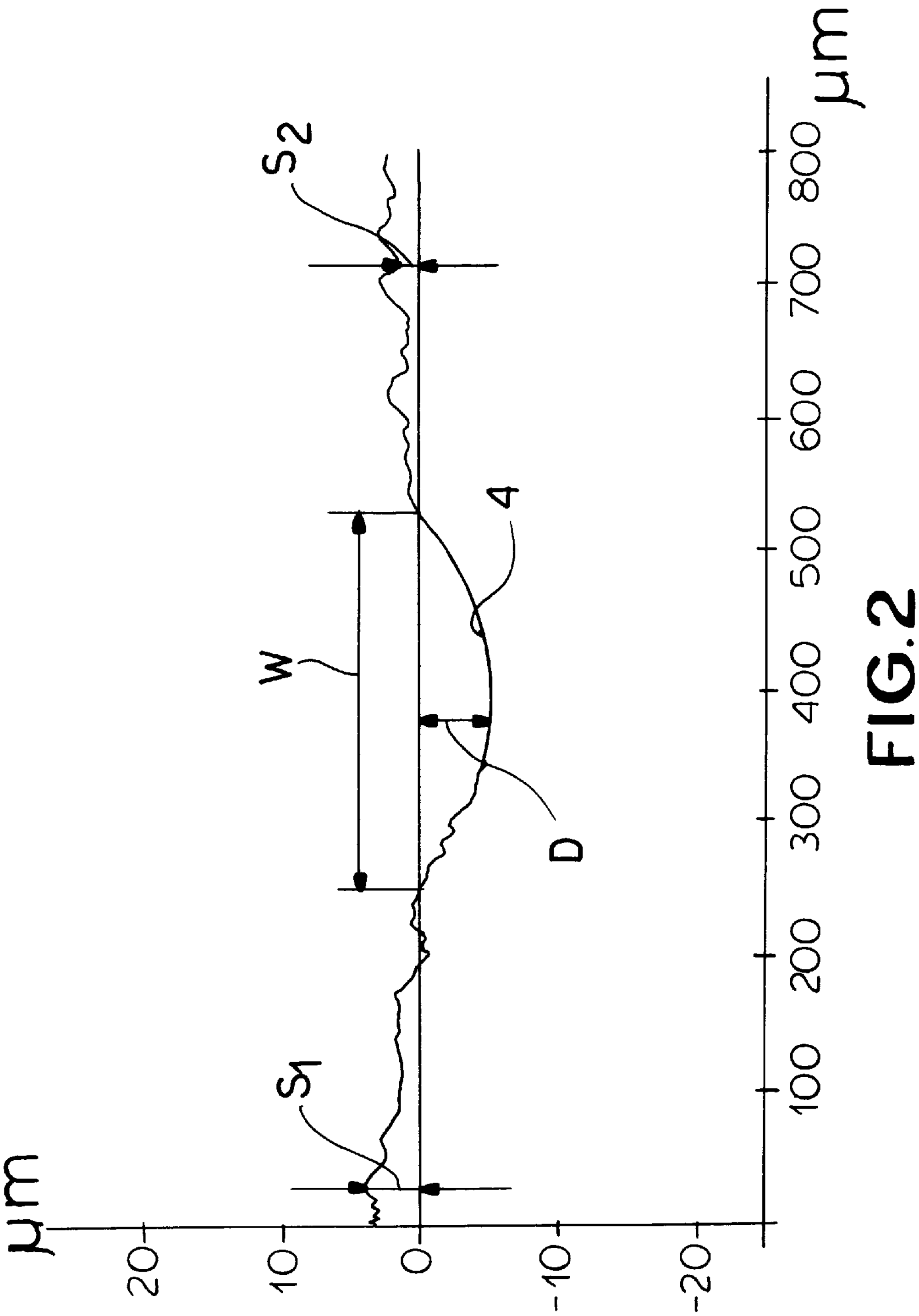
FIG. 2 is a graph in which the surface structure of the valve seat as a function of circumference has been shown in the region of the contact surface between the valve ball and the valve seat.

In the embodiment shown the mean diameter of the valve seat, measured at the contact surface of the valve ball, is 2.7 mm. The valve ball has a diameter of 3.9 mm. The trough has a circular-arc radius as formed by finish grinding in the valve seat of 2.9 mm which, as noted, is greater than the radius of the valve ball. The width of the trough is 300 μm and the maximum depth of the trough is 5 μm (FIG. 2). The leakage rate when the ball is in place is no greater than 0.03 $cm^3$ at a pressure differential of 2.5 bar.

Figure 3:
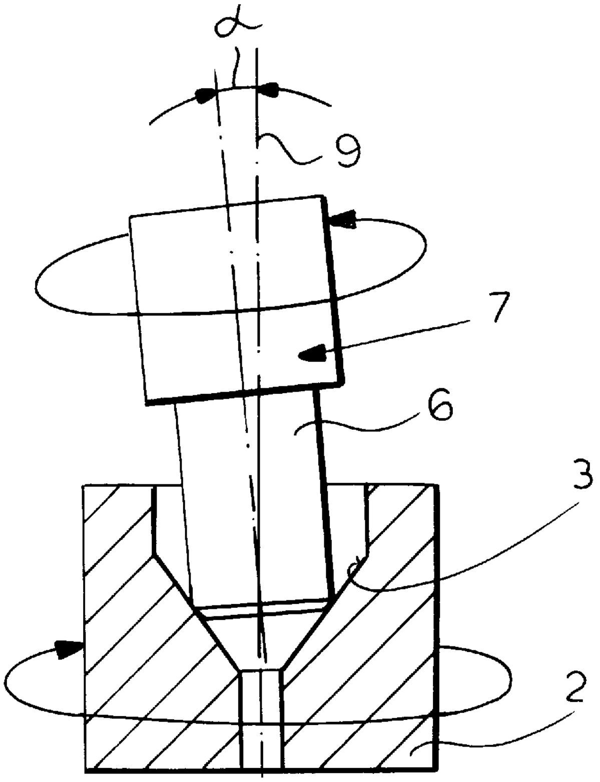
FIG. 3 is a diagram illustrating the process by which the seating surface is fabricated.

The process for making the sealing unit as has been described is schematically illustrated in FIG. 3. The valve body 2 with its previously conically ground valve seat 3 for the valve ball is clamped in a rotatably-driven workpiece holder 5. The cylindrical grinding stone for finish grinding as represented at 6, is received in an insert 7 in a tool holder 8 to allow radial compensatory movement as has been described, the holder 8 retaining the grinding tool at an angle of attack α of 1 to 10° inclined to the rotation axis 9 of the workpiece holder. The tool holder 8 is urged toward the workpiece holder 5 or vice versa or the two are urged toward one another so that an edge of an end face of the grinding tool 6 forms the trough-shaped contact surface in the valve seat as the tool holder 8 and workpiece holder 5 are driven in opposite senses.

Figure 4:
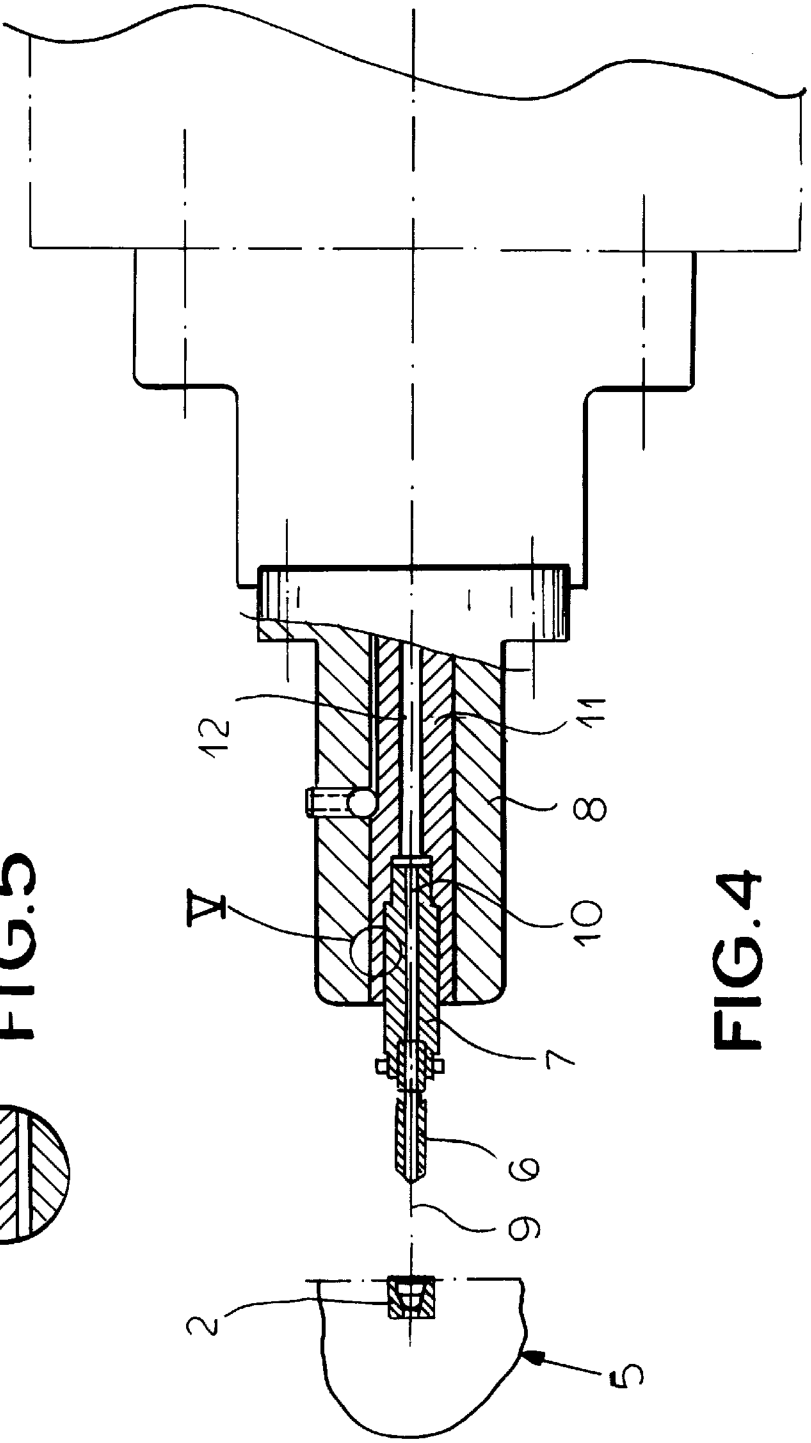
FIG. 4 is an axial section through an apparatus for carrying out the method of FIG. 3.
Figure 5:
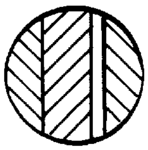
FIG. 5 is a detail of the region V of FIG. 4.

The apparatus for this purpose has been shown in FIGS. 4 and 5. Here the grinding stone 6 is shown to be held in a synthetic resin shaft which forms a flexible insert 7 with a radial play of 100 to 300 μm in the tool holder 8 and has a rearwardly-extending stem 10 with a press fit clamped in the tool holder 8. The shaft 7 is received in a positioning piston 11 axially displaceable in the tool holder 8 by hydraulic fluid so that the grinding stone can be moved axially relative to the workpiece holder 5. The tool holder, the insert and the grinding stone have an axial bore 12 for supplying the cooling fluid to the grinding surface.

It is claimed:

1. A fuel injection valve for an internal combustion engine comprising:

a valve ball;

a valve body having a machined conical seat receiving said valve ball and a shape deviating from the circular in a transverse cross section perpendicular to the axis of the conical seat, said conical seat being formed with a finish ground seating surface of circular-arc-segmental shape in axial section having a radius of curvature greater than a radius of the valve ball and extending circumferentially, said seat surface constituting an annular trough in the transverse cross section with a depth at a deepest part of 2 to 10 μm and sufficient to eliminate the shape deviations along the seating surface and to prevent leakage between the valve ball and the valve body.

2. The fuel injection valve defined in claim 1 wherein said seating surface has a width in the conical seat of 200 to 500 μm and a surface roughness less than 0.1 μm Ra.

* * * * *